US009285654B2

(12) United States Patent
Lipson et al.

(10) Patent No.: US 9,285,654 B2
(45) Date of Patent: Mar. 15, 2016

(54) MINIATURE CAMERA MODULE WITH MEMS-ACTUATED AUTOFOCUS

(71) Applicant: DigitalOptics Corporation, San Jose, CA (US)

(72) Inventors: Ariel Lipson, Tel-Aviv (IL); Uri Kinrot, Tel-Aviv (IL); Dalit Bahar, Tel-Aviv (IL); Moshe Kriman, Tel-Aviv (IL); Moshe Levy, Tel-Aviv (IL); Ocie Ward, Petaluma, CA (US); Mark Harland, Hilton, NY (US)

(73) Assignee: DigitalOptics Corporation, San Jose, CA (US)

( * ) Notice: Subject to any disclaimer, the term of this patent is extended or adjusted under 35 U.S.C. 154(b) by 70 days.

(21) Appl. No.: 13/792,132

(22) Filed: Mar. 10, 2013

(65) Prior Publication Data

US 2013/0265479 A1    Oct. 10, 2013

Related U.S. Application Data

(60) Provisional application No. 61/609,293, filed on Mar. 10, 2012, provisional application No. 61/643,331, filed on May 6, 2012.

(51) Int. Cl.
| | |
|---|---|
| *H04N 5/232* | (2006.01) |
| *G03B 13/36* | (2006.01) |
| *G03B 3/10* | (2006.01) |
| *G03B 5/00* | (2006.01) |
| *G02B 13/00* | (2006.01) |
| *G02B 7/09* | (2006.01) |
| *G02B 26/08* | (2006.01) |
| *H04N 5/225* | (2006.01) |

(52) U.S. Cl.
CPC ........ *G03B 13/36* (2013.01); *G02B 7/09* (2013.01); *G02B 13/009* (2013.01); *G02B 26/0833* (2013.01); *G03B 3/10* (2013.01); *G03B 5/00* (2013.01); *H04N 5/2257* (2013.01); *H04N 5/23212* (2013.01); *H04N 5/23296* (2013.01); *G03B 2205/0046* (2013.01); *G03B 2205/0053* (2013.01)

(58) Field of Classification Search
CPC ............ H04N 5/2257; H04N 5/23212; H04N 5/2254; H04N 5/23296; G02B 13/009; G02B 13/001; G02B 7/08–7/09; G02B 26/0833; G03B 2205/0046; G03B 2205/0053; G03B 3/10; G03B 13/36; G03B 5/00; Y10T 29/49002
USPC .................................. 348/345, 347, 335, 340
See application file for complete search history.

(56) References Cited

U.S. PATENT DOCUMENTS

| | | | |
|---|---|---|---|
| 6,731,339 B2* | 5/2004 | Ohkawara ..................... 348/347 |
| 7,269,344 B2* | 9/2007 | Nishioka et al. ............... 396/60 |
| 7,693,409 B2* | 4/2010 | Morimoto ....................... 396/85 |
| 7,719,605 B2* | 5/2010 | Hirasawa et al. ............. 348/345 |
| 8,508,649 B2* | 8/2013 | Reshidko et al. ............ 348/345 |
| 2001/0017662 A1* | 8/2001 | Nomura et al. ............... 348/358 |
| 2001/0040630 A1* | 11/2001 | Matsuzaka .................... 348/240 |

(Continued)

*Primary Examiner* — Amy Hsu
(74) *Attorney, Agent, or Firm* — Haynes and Boone, LLP

(57) ABSTRACT

A miniature MEMS autofocus camera module includes a MEMS actuated movable lens group and at least one fixed lens group defining an optical axis within a camera module housing. Objects disposed an arbitrary distance from the camera module are automatically focused at a determined zoom to an image sensor. MEMS actuation of the movable lens group is performed to accomplish autofocus functionality.

17 Claims, 18 Drawing Sheets

(56) References Cited

U.S. PATENT DOCUMENTS

| | | | |
|---|---|---|---|
| 2002/0047912 A1* | 4/2002 | Mabuchi et al. | 348/345 |
| 2004/0017491 A1* | 1/2004 | Stavely | 348/240.2 |
| 2004/0266477 A1* | 12/2004 | Murata | 455/556.1 |
| 2006/0103754 A1* | 5/2006 | Wenstrand et al. | 348/349 |
| 2007/0019907 A1* | 1/2007 | Alcock et al. | 385/33 |
| 2007/0053672 A1* | 3/2007 | Westerweck et al. | 396/79 |
| 2007/0081224 A1* | 4/2007 | Robinson et al. | 359/245 |
| 2007/0211164 A1* | 9/2007 | Olsen et al. | 348/345 |
| 2008/0170151 A1* | 7/2008 | McAllister et al. | 348/340 |
| 2009/0015706 A1* | 1/2009 | Singh | 348/340 |
| 2009/0066832 A1* | 3/2009 | Hirasawa et al. | 348/345 |
| 2009/0290021 A1* | 11/2009 | Rudesill et al. | 348/148 |
| 2009/0295936 A1* | 12/2009 | Ohkuma | 348/222.1 |
| 2010/0177238 A1* | 7/2010 | Saito | 348/374 |
| 2011/0298968 A1* | 12/2011 | Tseng et al. | 348/373 |
| 2012/0200764 A1* | 8/2012 | Afshari et al. | 348/345 |
| 2012/0307089 A1* | 12/2012 | Rukes | 348/208.99 |

* cited by examiner

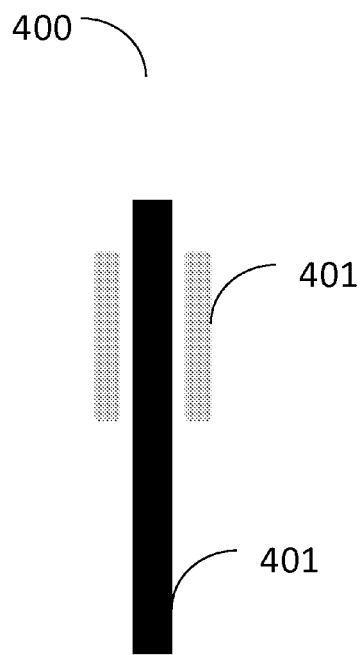
Figure 4A
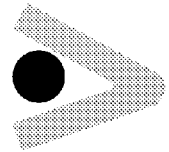
Figure 4C
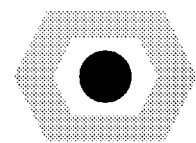
Figure 4D
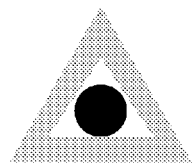
Figure 4E
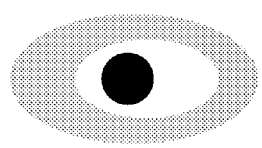
Figure 4F
Figure 4B
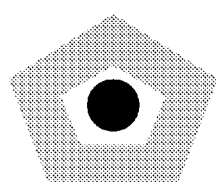
Figure 4G

Auto Focus Zoom Concept
Fixed Focus
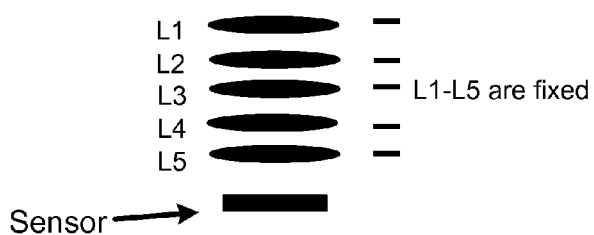
L1-L5 are fixed
VCM AF
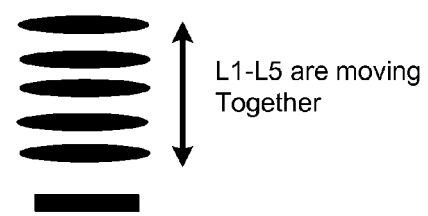
L1-L5 are moving Together
Figure 10A   Figure 10B
Auto Focus Zoom
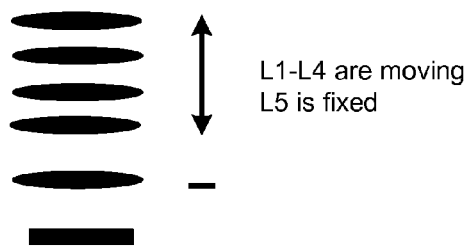
L1-L4 are moving
L5 is fixed
- L5 is fixed at the BFL distance
- L5 compensates for the big field curvature
Figure 10C

Zoom factor

- OZ system creates zoom using a distorted lens and excess amount of pixels in the sensor
- The OZ zoom factor is calculated as follows:

OptiML zoom factor = Lens distortion zoom x Extra pixels zoom x Digital zoom

Optical zoom

- Assuming the output is 5MPs, the following table presents the optical zoom factor obtained by extra pixel only:

| Sensor pixel count | Extra pixels Zoom factor |
|---|---|
| 8MPs | 1.265 |
| 10MPs | 1.414 |
| 12MPs | 1.550 |
| 14MPs | 1.673 |

- Best optical result is obtained with higher MPs, but the trade-off is with sensor cost.

Figure 15

Zoom factor (Cont.)

- The zoom factor provided by the OZ lens depends on the allowed total-track-length (TTL) of the lens.
    - Large TTL (~7mm) can provide zoom factor of ~x1.42 (at center field)
    - Smaller TTL (~5.7mm) can provide zoom factor of ~x1.32 (at center field)

- Assuming the output is 5MPs, input sensor is 12MP and the lens we're using is with low TTL, then the overall optical zoom factor obtained by OZ system (at center field) is - ~x2.

- If we use a larger lens (TTL ~7mm) the optical zoom factor will be ~x2.2

Figure 16

Zoom Factor 12MP Input Sensor Example

| Input Image H Size | Input Image V Size | Lens Distortion Factor | Output Image Size | Output Image H Size | Output Image V Size | Zoom Factor | Total Optical Zoom | Total Digital Zoom |
|---|---|---|---|---|---|---|---|---|
| 4096 | 3072 | 1.32 | | | | | | |
| | | | 8MP | 3264 | 2448 | 3 | 1.66 | 1.81 |
| | | | 5MP | 2592 | 1944 | 3 | 2.09 | 1.44 |
| | | | 3MP | 2048 | 1536 | 3 | 2.64 | 1.14 |
| | | | 2MHD | 1920 | 1080 | 3 | 3.25 | 0.92 |
| | | | 1.3MP | 1280 | 1024 | 3 | 4.09 | 0.73 |

Figure 17

Zoom Factor 8MP Input Sensor Example

| Input Image H Size | Input Image V Size | Lens Distortion Factor | Output Image Size | Output Image H Size | Output Image V Size | Zoom Factor | Total Optical Zoom | Total Digital Zoom |
|---|---|---|---|---|---|---|---|---|
| 3264 | 2448 | 1.32 | 5MP | 2592 | 1944 | 3 | 1.66 | 1.80 |
| | | | 3MP | 2048 | 1536 | 3 | 2.10 | 1.43 |
| | | | 2MHD | 1920 | 1080 | 3 | 2.59 | 1.16 |
| | | | 1.3MP | 1280 | 1024 | 3 | 3.26 | 0.92 |
| | | | | | | | | |
| | | | | | | | | |

Figure 18

MINIATURE CAMERA MODULE WITH MEMS-ACTUATED AUTOFOCUS

PRIORITY

This application claims the benefit of priority to U.S. provisional patent application Ser. Nos. 61/609,293, filed Mar. 10, 2012; and 61/643,331, filed May 6, 2012, which are incorporated by reference.

This application is one of a group of related, contemporaneously-filed patent applications by the same Assignee and Inventors, entitled: MINIATURE CAMERA MODULE WITH MEMS-ACTUATED AUTOFOCUS Ser. No. 13/792,132; MINIATURE MEMS AUTOFOCUS ZOOM CAMERA MODULE Ser. No. 13/792,137; CAMERA MODULE WITH MEMS AUTOFOCUS AND ZOOM Ser. No. 13/792,139; MEMS AUTOFOCUS CAMERA MODULE WITH ALIGNMENT REGISTRATION Ser. No. 13/792,140; CAMERA MODULE WITH PROCESSOR-BASED MEMS-ACTUATED AUTOFOCUS Ser. No. 13/792,145; MEMS AUTOFOCUS CAMERA MODULE WITH MULTIPLE LENS GROUPS Ser. No. 13/792,147; MEMS AUTOFOCUS CAMERA MODULE WITH FIXED AND MOVABLE LENS GROUPS Ser. No. 13/792,148, which are incorporated by reference.

BACKGROUND

1. Field of the Invention

The present application is related to electronic cameras and more particularly, to electronic cameras with autofocus and/or zoom, and particularly having optical and electrical integration of autofocus and/or zoom components.

2. Description of the Related Art

If the position of an optical train of a camera is fixed relative to the position of the image sensor, the resulting electronic camera is said to be fixed focus. Rigidly fixing the optical system in place means only objects that are a certain distance from the camera will be in focus on the image sensor. Fixed focus cameras have advantages in terms of smallness of physical dimensions and cost, but the performance is limited. In particular, the focus distance is often set at 1.2 m so that objects from 60 cm to infinity appear tolerably sharp. However, the image sharpness is not especially good and objects that are closer to the camera than 60 cm will be blurred.

While it is possible to set the focus at a closer distance to correct for this problem, this means that the sharpness of distant objects declines in compensation. A characteristic that is common to both conventional fixed and auto focus cameras is that the area that can be viewed, known as the field of view of the camera, is determined by the optical design and the dimensions of the image sensor and cannot be changed. For convenience, field of view is often described as the equivalent solid angle in the horizontal, vertical or diagonal plane.

Cropping an image to reduce the field of view has advantages that it entails no moving parts, can be performed almost instantaneously and involves very low power and physical space to implement. It is a relatively low cost method of changing the field of view. However cropping involves the loss of information. That is, to restrict the field of view, an image is cropped to, say, one quarter of its original area, such that three quarters of the image is discarded. Consequently, a cropped image can often have inferior quality to both the original image and a mechanical zoom image of the same field of view.

Generally, the lower the quality of the optical train, the larger the PSF or point spread function will be. In many conventional cameras, the optical train tends to be underspecified, such that points of captured light spread excessively to cover several pixels resulting in blurred images.

Lenses may be assembled in a lens turret to form an optical train. In a conventional method, a lens turret may be fabricated first, after which the lenses may be inserted, and then fixed in a desired location inside the lens turret. Methods of enhanced precision are desired.

BRIEF DESCRIPTION OF THE DRAWINGS

FIGS. 4A-4B illustrate a circular sleeve in accordance with embodiments in section and plan views.

FIGS. 4C-4G illustrate a selection of sleeves for guide pins that may be used in certain embodiments.

FIG. 10A illustrates optics for a fixed focus camera.

FIG. 10B illustrates optics for an auto-focus camera.

FIG. 10C illustrates an example of an optical train for an autofocus zoom camera in accordance with embodiments.

FIGS. 15-18 illustrate advantageous examples involving zoom factors for camera modules in accordance with embodiments.

DETAILED DESCRIPTIONS OF THE EMBODIMENTS

Figure 1:
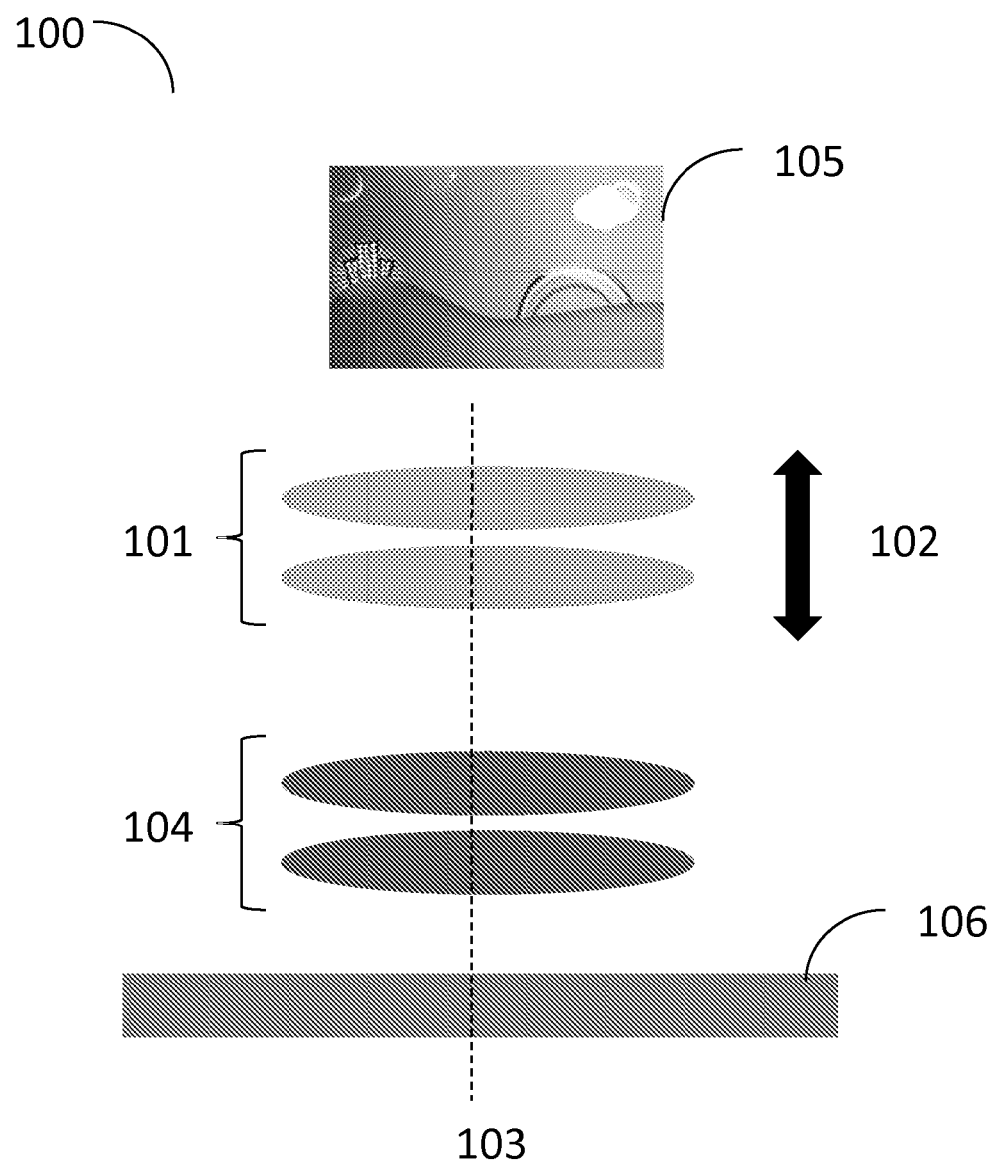
FIG. 1 illustrates schematically certain components of an optical train of an auto focus zoom camera in accordance with embodiments, including fixed and moving lens groups for imaging a scene onto an image sensor.

A miniature MEMS autofocus camera module is provided that includes a MEMS actuated movable lens group and at least one fixed lens group defining an optical axis within a camera module housing within which objects disposed an arbitrary distance from the camera module are automatically focused at a determined zoom to an image sensor by MEMS actuation of the movable lens group to accomplish autofocus functionality.

The camera module may include a processor and embedded code for programming the processor to electronically zoom the image data. The electronic zoom may utilize both electronic and optical processing elements. The optical autofocus may also utilize both electronic and optical processing elements. One or more lenses may participate as a same electronic and optical processing element used for both the optical autofocus and the electronic zoom.

The at least one fixed lens group may include first and second lens groups. The movable lens group may be disposed between the first and second fixed lens groups.

An optical assembly for a miniature MEMS autofocus camera module is also provided including a MEMS actuated movable lens group and at least one fixed lens group defining an optical axis within a housing configured to couple with an image sensor component to capture digital images of objects disposed an arbitrary distance from the camera module that are automatically focused at a determined zoom to an image sensor portion of the image sensor component by MEMS actuation of the movable lens group to accomplish autofocus functionality.

The optical assembly may include contact pads for coupling with a processor programmed to electronically zoom the image data. The electronic zoom may utilize both electronic and optical processing elements. The optical autofocus may also utilize both electronic and optical processing elements. One or more lenses may participate as a same electronic and optical processing element used for both the optical autofocus and the electronic zoom.

The at least one fixed lens group may include first and second lens groups. The movable lens group may be disposed between the first and second fixed lens groups.

An autofocus zoom miniature MEMS camera module is provided that includes a housing with an aperture for capturing digital images, an image sensor and an optical assembly. The optical assembly is provided with at least one fixed lens group and at least one movable lens group. A MEMS actuator is configured to move the movable lens group along an optical axis of the camera module relative to the image sensor and the fixed lens group to automatically focus an object at a determined zoom disposed an arbitrary distance from the camera module onto the image sensor.

The movable lens group may include one or more movable lenses disposed nearest an object end of the optical path that are movable along the optical axis of the camera. The fixed lens group may include one or more fixed lenses disposed between the movable lens group and the image sensor that are fixed in position relative to the image sensor, housing or a substrate to which the image sensor is coupled, or combinations thereof.

The image sensor may be disposed approximately at a back focal length of the one or more fixed lenses. The one or more fixed lenses may be configured to compensate for a field curvature induced by the one or more moving lenses. The one or more fixed lenses may be configured to match an associated point spread function to a pixel dimension of the image sensor approximately uniformly over an area of the image sensor. The one or more fixed and movable lenses may be configured such that an autofocus distance range comprises 10 cm to 9 m. The one or more fixed and movable lenses may be configured such that an autofocus distance range comprises 15 cm to 5 m. The one or more fixed and movable lenses may be configured such that an autofocus distance range comprises 20 cm to 3 m. The autofocus distance may exclude a hyperfocal distance.

An optical assembly for an autofocus zoom miniature MEMS camera module is also provided that includes a housing defining an aperture, one or more lenses that are fixed relative to the housing, a MEMS actuator, and one or more movable optical elements coupled to the MEMS actuator. An object disposed an arbitrary distance from a camera module that includes the optical assembly is automatically focused at a determined zoom onto the image sensor by MEMS actuation of the one or more movable optical elements.

The optical assembly and/or MEMS camera module may include a zoom feature ranging between ×0.5 and ×5, or between ×1 and ×3.

The optical assembly may include a movable lens housing containing the one or more movable lenses.

An optical axis of the one or more movable optical elements may be displaced from an optical axis of the camera module by not more than approximately 0.5 mm, or by not more than approximately 0.2 mm, or by not more than approximately 0.1 mm.

The movable and fixed lens groups may be relatively disposed with a centering alignment within 90 microns, or in a range between 40 microns and 140 microns.

A third lens group may be fixed relative to the housing. The movable lens group may be disposed between the first and third fixed lens groups.

The focus travel length of the second lens group may be more than 50, 100, 200, or 300 microns, and/or within a range between 100 microns and 300 microns or within a range between 50 microns and 500 microns.

Another autofocus zoom miniature MEMS camera module is provided that includes a housing, a MEMS actuator, one or more movable optical elements coupled to the MEMS actuator, an image sensor, a processor, and a storage medium having code embedded therein for programming the processor to perform an autofocus zoom method. An object disposed an arbitrary distance from the camera module is automatically focused at a determined zoom onto the image sensor by MEMS actuation of the one or more movable optical elements.

The code may be configured to program the processor to correct for distortion or another artifact produced in a predictable manner by one or more optical elements of the camera. The code may be configured to program the processor to process information from image sensor pixels irrespective of a number of pixels within an image area that are illuminated by the one or more optical elements.

The code may be implemented in hardware or software or both.

The processor may be configured to perform an autofocus zoom method within an image processing pipeline on the image sensor.

The processor may be configured to perform the autofocus zoom method on a discrete platform. The discrete platform may include an image processor or image signal processor. The discrete platform may include a baseband chip in a mobile phone. A machine readable file that has largely constant size and effective image resolution irrespective of autofocus zoom setting.

The camera may be configured with a zoom feature ranging between ×0.5 and ×5, or between ×1 and ×4, or between ×1 and ×3.

A movable lens housing may contain the one or more movable lenses. The movable lens housing may be configured to be movable mechanically along the optical axis of the camera. The MEMS actuator or another actuator may be configured to move the movable lens housing along the optical axis. The movable lens housing may include one or more guide pins and one or more sleeves configured such that the guide pins are fixed in position while the sleeves move along the guide pins.

The guide pins may be mechanically referenced to the image sensor and the sleeves may be joined to the movable lens housing. The guide pins may include two or more guide pins, or three or more guide pins, or five or more guide pins. The guide pins may include a circular cross section. The one or more sleeves may include a shape, when viewed in section, that forms one or more area contacts to the guide pins. The shape of the one or more sleeves may include an oval shape, a "V" shape, a triangular shape, a square shape, a pentagon shape, a hexagon shape, and/or another polygon shape, e.g., a regular polygon, or an irregular polygon, or the one or more sleeves may have a circular shape.

The one or more sleeves may be configured to be forced into contact with the one or more guide pins by a lateral force. The lateral force may include approximately 0.5 grams. A spring may be used to provide the lateral force. A magnet may be used to provide the lateral force.

A movable housing may include one or more guide pins and one or more flexible components that are flexible in a direction along the optical axis. The guide pins may be fixed in position while the flexible components move along the guide pins. The one or more flexible components may include leaf springs that are fixedly attached to the guide pins and the movable lens housing. The one or more flexible components may include one or more opposing pairs having a spring rate that is approximately constant through a flexure range.

The camera module housing and image sensor may define an optical axis of the MEMS camera module. An axis of the one or more movable optical elements may be displaced from the optical axis of the MEMS camera module by not more than approximately 0.5 mm, or by not more than approximately 0.2 mm, or by not more than approximately 0.1 mm.

The MEMS actuator may be configured to move the one or more movable lenses within a range between 50 and 500 microns, or within a 350 micron range, or within a 200 micron range.

A method of assembly of a miniature MEMS camera module is provided. The method includes abutting registration features of an optical assembly that includes both a fixed lens group and a movable lens group including one or more movable lenses, and affixing the movable lens group in location within a movable lens housing. A MEMS actuator is coupled to the movable lens group or housing or both, whereby in use the MEMS actuator is configured to move the movable lens group relative to the fixed lens group to automatically adjust a focus distance of the optical assembly.

The affixing may involve applying an adhesive. The applying an adhesive may include joining the movable lens housing to a sleeve that is configured to couple with a pin that is fixed to the miniature camera module.

The method may include coupling the optical assembly with an image sensor component, which may involve fixing the fixed lens group relative to an image sensor portion of the image sensor component while the movable lens group or movable lens housing or both is configured to be movable relative to the image sensor portion by actuation of the MEMS actuator to adjust said focus distance of the optical assembly. The method may further include coupling the image sensor component to a printed circuit.

The miniature MEMS camera module, upon assembly, may define an optical axis that is displaced from an axis of the movable lens group not more than approximately 0.5 mm, or not more than approximately 0.2 mm, or not more than approximately 0.1 mm.

A miniature MEMS autofocus camera module is also provided that includes a housing, an image sensor coupled to the housing, an autofocus optical module coupled within the housing and including a MEMS actuator that is configured to move one or more movable lenses relative to one or more fixed lenses along an optical axis of the camera module to adjust a focusing distance of the autofocus optical module to automatically focus an object disposed an arbitrary distance from the camera module onto the image sensor. This miniature MEMS autofocus optical module includes one or more pairs of adjacent lens surfaces that include abutting registration features to aid in alignment. An optical assembly for a miniature MEMS autofocus camera module is also provided.

The one or more movable lenses may be disposed nearest an object end of the optical path between a housing aperture and the image sensor. The one or more fixed lenses may include at least a first fixed lens disposed between the one or more movable lenses and the image sensor. The image sensor may be disposed approximately at a back focal length of the first fixed lens.

The one or more fixed lenses may include at least a second fixed lens disposed between the object end and the one or more movable lenses, such that the one or more movable lenses are disposed between the first and second fixed lenses. The second fixed lens may be configured in accordance with a processor-implemented zoom component to apply zoom to captured image data.

The miniature MEMS camera module, upon assembly, may define an optical axis that is displaced from an axis of the movable lens group not more than approximately 0.5 mm, or not more than approximately 0.2 mm, or not more than approximately 0.1 mm. The one or more fixed lenses may include first and second fixed lens groups each comprising one or more lenses that are fixed relative to the image sensor. The one or more movable lenses may be disposed between the first and second fixed lens groups.

A miniature MEMS autofocus camera module is also provided that includes an image sensor and an optical assembly including a movable lens group that includes one or more lenses and that is coupled to a MEMS actuator such that the movable lens group is movable relative to the image sensor. The optical assembly also includes at least a first fixed lens group that comprises one or more lenses and that is fixed relative to the image sensor. A processor is programmed to control an autofocus method designed to adjust a focus distance to an object disposed an arbitrary distance from the miniature MEMS autofocus camera module by actuating the MEMS actuator that is coupled with the movable lens group.

The optical assembly may include a second fixed lens group that includes one or more lenses that are fixed relative to the image sensor. The movable lens group may be disposed between the first and second fixed lens groups.

A first surface of the one or more fixed lenses furthest from the image sensor and a second surface of the one or more movable lenses nearest to the image sensor may be provided with one or more physical registration features configured to abut to aid alignment during assembly.

A spacer may be disposed between the first and second surfaces. The spacer may have been inserted for operation after assembly. The absence of the spacer during assembly may have permitted the registration features of the first and second surfaces to abut. The spacer may be configured to achieve a separation in a range between 50 and 500 microns, or in a range between 50 and 150 microns, or in a range between 200 and 300 microns, or the spacer may be configured to achieve a separation of approximately 100 microns, or approximately 250 microns.

The optical assembly may include one or more pairs of adjacent lens surfaces that include abutting registration features.

The miniature MEMS camera module, upon assembly, may define an optical axis that is displaced from an axis of the movable lens group not more than approximately 0.5 mm, or not more than approximately 0.2 mm, or not more than approximately 0.1 mm.

In operation of the autofocus zoom module, a registration of de-center between the one or more fixed lenses and the one or more moving lenses may be approximately seven microns or less, or approximately five microns or less, or approximately three microns or less.

In operation of the autofocus zoom module, a registration of tilt between the one or more fixed lenses and the one or more moving lenses may be approximately 0.3 microns or less, or approximately 0.2 microns or less, or approximately 0.1 microns or less.

An optical assembly for a miniature MEMS camera module may include an optical assembly housing, configured for coupling with an image sensor component, and an autofocus optical module coupled within the housing. The autofocus optical module includes a MEMS actuator that is configured to move one or more movable lenses relative to one or more fixed lenses along an optical axis to adjust a focusing distance of the autofocus optical module.

The one or more movable lenses may be disposed nearest an object end of the optical path and may be movable along the optical axis. The one or more fixed lenses may be disposed nearest an image end of the optical path and may be fixed in position relative to the housing. The optical assembly housing may be configured to couple with an image sensor portion of the image sensor component that is disposed approximately at a back focal length of the one or more fixed lenses.

The one or more fixed lenses may include first and second fixed lens groups each having one or more lenses that are fixed relative to the housing. The one or more movable lenses may be disposed between the first and second fixed lens groups. The optical assembly may include one or more pairs of adjacent lens surfaces that include abutting registration features. The optical assembly, upon assembly with an image sensor component, may define an optical axis that is displaced from an axis of the movable lens group not more than approximately 0.5 mm, or not more than approximately 0.2 mm, or not more than approximately 0.1 mm.

The optical assembly and an image sensor component may be coupled to form an autofocus camera module, whereby a registration of de-center between the one or more fixed lenses and the one or more moving lenses comprises approximately seven microns or less, or approximately five microns or less, or approximately three microns or less.

A registration of tilt between the one or more fixed lenses and the one or more moving lenses of the optical assembly may comprise approximately 0.3 microns or less, or approximately 0.2 microns or less, or approximately 0.1 microns or less.

A further miniature MEMS autofocus camera module is provided that includes an image sensor and an optical assembly including a movable lens group that includes one or more lenses and that is coupled to a MEMS actuator such that the movable lens group is movable relative to the image sensor. The optical assembly further includes at least a first fixed lens group that includes one or more lenses and that is fixed relative to the image sensor. In operation of the miniature MEMS autofocus camera module, a registration of de-center between the one or more fixed lenses and the one or more moving lenses comprises approximately seven microns or less.

A first surface of a first fixed lens of the first fixed lens group and a second surface of a first movable lens of the movable lens group may be provided with one or more physical registration features configured to abut to aid alignment.

A first surface of the one or more fixed lenses furthest from the image sensor and a second surface of the one or more movable lenses nearest to the image sensor may be provided with one or more physical registration features configured to abut to aid alignment.

In operation of the autofocus zoom module, a registration of de-center between the one or more fixed lenses and the one or more moving lenses may comprise approximately five microns or less, or approximately three microns or less.

In operation of the autofocus zoom module, a registration of tilt between the one or more fixed lenses and the one or more moving lenses comprises approximately 0.3 microns or less, or approximately 0.2 microns or less, or approximately 0.1 microns or less.

A spacer may be disposed between the first and second surfaces. The spacer may have been inserted for operation after assembly. The absence of the spacer during assembly may have permitted the registration features of the first and second surfaces to abut. The spacer may be configured to achieve a separation in a range between 50 and 500 microns, or in a range between 50 and 150 microns, or in a range between 200 and 300 microns, or the spacer may be configured to achieve a separation of approximately 100 microns, or approximately 250 microns.

Another miniature MEMS-actuated camera module is provided that includes one or both of a camera module housing or a rigid substrate that either defines an aperture or is coupled to an aperture, or both. An image sensor is coupled to the one or both of the camera module housing or rigid substrate. A first lens group is coupled to the housing and fixed relative to the image sensor or coupled directly to the image sensor or both. A MEMS actuator is coupled to the housing or rigid substrate. A second lens group is coupled to the actuator and is movable relative to the image sensor.

An optical assembly for the miniature MEMS camera module may include a housing that either defines an aperture or is coupled to an aperture, or both, and that is configured to couple with an image sensor component for focusing images with said optical assembly onto an image sensor portion of said image sensor component when said housing is coupled to said image sensor component, a first lens group coupled to and fixed relative to the housing, a MEMS actuator coupled to the housing, and a second lens group coupled to and movable with the MEMS actuator relative to the first lens group.

A rigid substrate may be coupled to the camera module housing.

A lens barrel may contain at least the second lens group.

The MEMS actuator may be coupled to one, two, three, four or more lenses of the second lens group for moving the one, two, three, four or more lenses along the optical path relative to the image sensor.

The second lens group may include four lenses. The first lens group may include a single lens.

The second lens group may include a single movable lens. The first lens group may include two fixed lenses. A third lens group may include one or two more fixed lenses. The second lens group may be disposed and movable through an autofocus range between the first and third fixed lens groups.

The first and second lens groups may be relatively disposed with a centering alignment within 1 micron, or within 3 microns, or within 5 microns, or within 10 microns.

The first and second lens groups may be relatively disposed with a tilt alignment within of 0.01°, or within 0.05°, or within 0.1°, or within 0.2°, or within 0.3°, or within 0.4°.

The first and second lens groups may be relatively disposed within a centering alignment in a range between of 1 micron and 10 microns, or in a range between 2 microns and 5 microns.

The first and second lens groups may be relatively disposed within a tilt alignment in a range between 0.05° and 0.3°, or in a range between 0.1° and 0.2°.

The focus travel length of the second lens group may be more than 50 microns, or more than 100 microns, or more than 150 microns, or more than 200 microns, or more than 250 microns, or more than 300 microns, or within a range between 100 microns and 300 microns, or within a range between 50 microns and 500 microns.

The first lens may be disposed a distance from the sensor along the optical path within a range between around its back focal length ±10 microns. The back focal length may include between 700 and 1100 microns, or between 500 and 1300 microns, or approximately 900 microns.

The second lens group and image sensor may be relatively disposed with a centering alignment within 90 microns, or in a range between 40 microns and 140 microns.

A third lens group may be coupled to the housing and fixed relative to the image sensor. The second lens group which is movable relative to the image sensor may be disposed between the first and third lens groups which are each fixed relative to the image sensor.

A camera in accordance with embodiments described herein includes an image sensor, which converts an image in an optical domain to an electronic format, and an optical train that focuses the scene of interest onto the image sensor. Embodiments include cameras configured with an enhanced ability to accurately capture detail in a scene. The quality of the optical train and/or the resolution of the image sensor may be selected in accordance with a desired ability to accurately capture such detail. The image sensor may contain millions of pixels (picture elements) and the optical train may include two, three, four, five or more lenses.

The position of at least one movable lens of the optical train is not fixed relative to the position of the image sensor, and thus, cameras in accordance with embodiments described herein can alter the distance from the electronic camera at which objects will be in focus on the image sensor. A system may be utilized in accordance with certain embodiments to determine one or more distances of one or more principal objects in a scene from the camera. The at least one movable lens is movable in accordance with the determined distance in certain embodiments and/or until one or more principle objects are in focus on the image sensor. These objects can range from being very close (10 cm or closer) to very distant (infinity) from the camera.

Embodiments are provided herein of cameras that provide image quality that is better than conventional autofocus and fixed focus cameras. Cameras in accordance with certain embodiments also exhibit miniature size, as well as advantageous power efficiency.

Electronic cameras in accordance with certain embodiments exhibit an advantageous capability to alter the field of view significantly. For example, a photograph of a family taken in front of their house might inadvertently include a refuse container at the edge of the scene when a conventional camera is being used. A camera in accordance with certain embodiments can be adjusted to restrict the field of view of the camera to eliminate this artifact from the captured image. Conversely, a photograph of a family taken on top of a hill can be enhanced using a camera in accordance with certain embodiments by adjusting to a wider field of view that captures more of the panorama.

It is possible to alter the field of view of an electronic camera in accordance with certain embodiments in multiple ways. One way is to alter an aspect of the optical system, e.g., using zoom capability, whereby one or two or more and in some embodiments four or more lenses, and/or one or more apertures, is/are movable back and forth along the optical axis of the camera.

Another way of changing the field of view of an electronic camera in accordance with certain embodiments is to crop, delete and/or clip peripheral regions of the captured scene when it is in electronic format, although cropping is subject to the limitations described above involving the discarding of peripheral image data. However, because a cropped image is smaller than the original, it can be electronically expanded so that it is the equivalent size as the original but, because parts of the scene are now absent, the effective field of view is diminished.

Another method of accomplishing zoom in an electronic camera in accordance with certain embodiments exploits matching the so-called point spread function of the optical train to the image sensor. Point spread function (PSF) can be defined as a quantity that describes the extent to which a theoretical point of light of zero area would expand as it passes through the optical train of the camera and/or would spread out by viewing, optical quality, diffraction, following up on accuracy, and/or the resolution of the sensor. The expansion occurs due to defects in the materials used for the lenses, surface imperfections, alignment tolerances and/or potentially a host of other factors. A good match between the optical train and image sensor occurs when the PSF matches the dimensions of the pixels in the image sensor. If the optical train is over-specified, the point of light will spread slightly and remain smaller than one pixel.

In certain embodiments, the PSF of the optical train does not vary significantly with the radius. This electronic camera has no significant mismatch between the PSF and pixel size across the lens radius. In some embodiments, the pixels in the center are smaller than those at the periphery to match the variation in PSF function across the lens radius.

In certain embodiments, the PSF is set to match the pixel size at about two thirds of the lens radius, particularly when it is determined that the objects of greatest interest in the scene are in the center of the image.

In an alternative embodiment, an optical train is designed so that at the periphery the PSF matches the pixel size of the imager. This optic design is adjusted as it is continued inwards, so that it results in the lens being over-specified since the PSF decreases towards the optical axis. In certain embodiments, the magnification of the optical system is increased towards the center. This magnification increases the effective size of the point of light and hence the effective PSF. The magnification may be set to be sufficient so that the PSF matches the pixel size over the entire area of the imager. The result is the lens has higher magnification in the center than at the periphery.

An electronic camera using an optic of the type described is able to provide for dynamic alteration of the field of view, in other words zoom, by imaging cropping. The resolution of the cropped image advantageously does not diminish since the center of the image has been magnified by the lens. The special optic involved in producing a dynamic field of view camera in accordance with certain embodiments generally produces distortion of the image that resembles barrel distortion. The extent of the distortion is fixed and controlled by the lens design. In certain embodiments, this distortion is corrected and removed, along with potentially one or more other predictable artifacts, using an advantageous image processing technique incorporated in a camera system in accordance with certain embodiments that has code embedded within a digital storage device for programming a camera processor to perform the technique and generate modified image data.

Cameras in accordance with certain embodiments exhibit clear improvements in overall performance by incorporating dynamic field of view feature with an auto focus mechanism. In certain embodiments, the design of the optical train of the camera includes a part that is fixed and a part that is movable along the optical axis of the camera by an actuator. In certain embodiments, some image processing is provided by code embedded within a fixed or removable storage device on the camera and/or using a remote processor, e.g., removal of image distortion.

Advantageous cameras are provided in accordance with certain embodiments that integrating all three of these in a compact camera module. Such camera module may be a stand-alone camera product, or may be included in a fixed or portable electronics product, and/or in various other environments such as automobiles.

Several embodiments will now be described with reference to the figures. Electronic cameras are provided herein that advantageously incorporate integrated auto focus and zoom functionality. In certain embodiments, the autofocus and zoom functions utilize a combination of an advantageous optical train and processor-based image processing, and in certain embodiments include the same or similar components in both cases.

An optical train in accordance with certain embodiments that is able to realize the desired functions of auto focus and zoom includes two general components (see FIG. 1). These are a first lens group 101 of one or more lenses that can be moved 102 along the optical axis 103 of the camera (hereafter referred to as the "moving lens") and a second lens group 104 of one or more lenses that are fixed in position (hereafter referred to as the "fixed lens"). The moving lens is the lens closest to scene 105 and the fixed lens is the lens closest to the imager 106. In general terms, the moving lens performs the function of altering the focal distance of the camera and the fixed lens performs the function of matching the PSF function of the optic to the imager and compensating for the field curvature induced by the moving lens.

The moving lens is located at an appropriate distance along the optical axis to achieve the desired focus distance, while the fixed lens is located such that its back focal length matches the distance between the lens and the imager.

A processor programmed by embedded code collects information from pixels in the image sensor and makes changes to the associated electronic file, in some cases automatically and in others based on user inputs. For example, the degree of zoom is adjustable. The processor endeavors to correct for distortion and other artifacts that are produced in a predictable manner by the optical train. The image processing features can be implemented in either hardware or software. In certain embodiments, these features are placed early in the image processing pipeline, such as RTL (resistor transistor logic) code embedded in the image sensor, while in others they are placed on an external DSP (digital signal processor) or entirely in software in a processor, such as the base band chip in a mobile phone.

The resulting auto focus zoom camera example illustrated at FIG. 1 has a focus distance that can range 1 0cm to 9 m, is typically 15 cm to 5 m and is preferably 20 cm to 3 m (excluding the hyper-focal distance), while the zoom function can range ×0.5-×5, is typically ×1-×4 and is preferably ×1-×3. A noteworthy characteristic of the final electronic file produced by the advantageous camera illustrated schematically at FIG. 1 is that file size and effective resolution of the image contained within it may be largely constant in certain embodiments irrespective of the focus distance and zoom setting.

In contrast to traditional electronic cameras that are either fixed focus, where no lenses move, or auto focus where the entire optical train is moved, advantageous cameras in accordance with embodiments described herein include optical trains with both a movable component and a fixed component. These advantageous auto focus zoom cameras have one or more parts of the optical train fixed and one or more parts moving. In certain embodiments, cameras exhibit exactitude of centering and tilt alignment of the moving lens to the fixed lens that differs from conventional fixed or auto focus cameras.

Figures 2A, 2B:
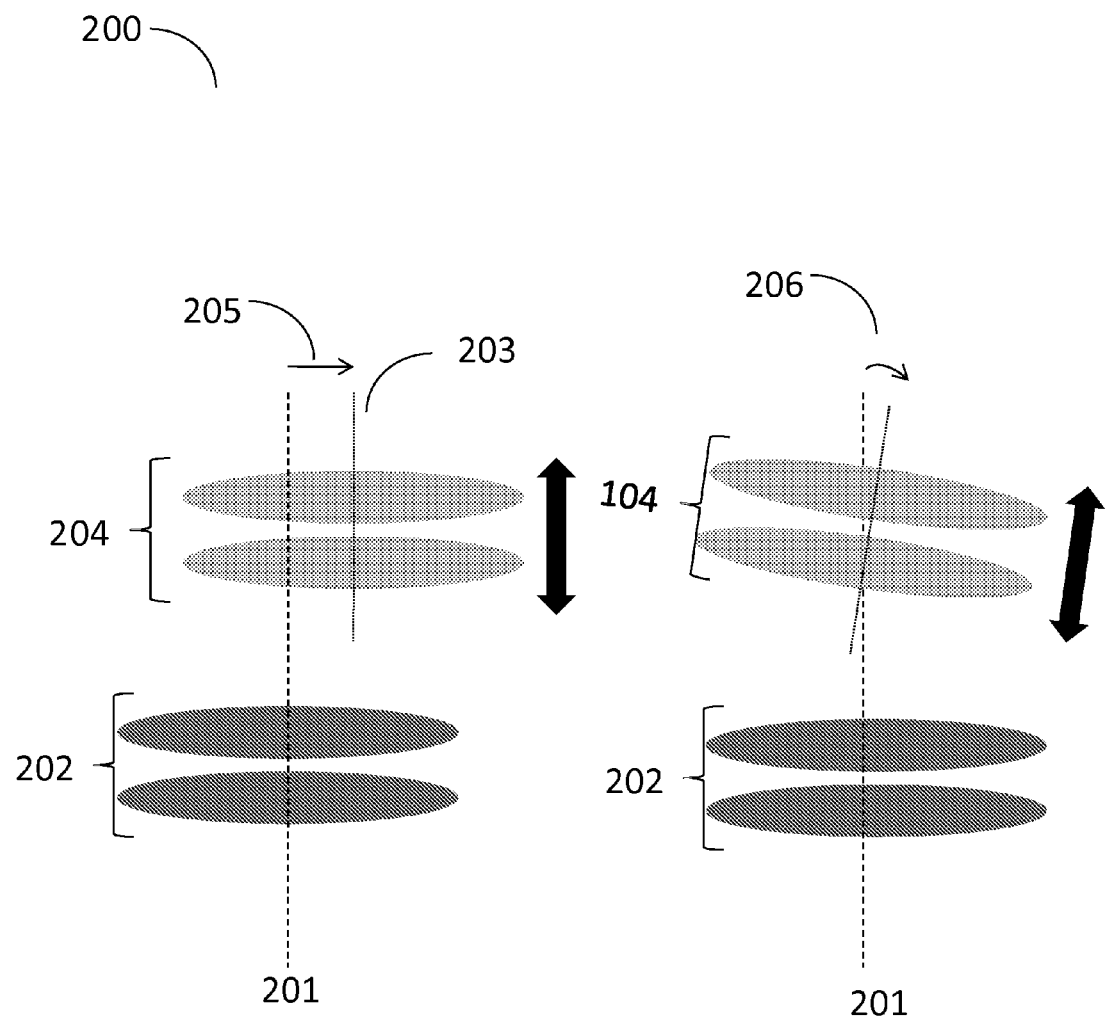
FIGS. 2A-2B illustrate center and tilt misalignments, respectively, between the fixed and moving lens groups of an auto focus zoom camera in accordance with certain embodiments.

With reference to the example illustrated schematically at FIG. 2: The registration of de-center between the fixed and moving lens can range +/−7 um, is typically +/−5 um and is preferably +/−3 um. When the optical axis 201 of the camera and the fixed lens 202 is not co-incident with the optical axis 203 of the moving lens 204, de-center 205 results. The registration of tilt is between the fixed and moving lens can range +/−0.3 um, is typically +/−0.2 um and is preferably +/−0.1 um. When the optical axis optical axis 203 of the moving lens 204 is tilted with respect to the optical axis 201 of the camera and the fixed lens 202, tilt 206 results.

The above features may be advantageously achieved when cameras in accordance with certain embodiments are first assembled and then are sustained when the camera is operated, in particular when the moving lens is intentionally displaced along the optical axis of the camera. How these criteria are met during assembly and operation of the camera are two further advantageous features of cameras in accordance with embodiments described herein.

Figures 3A, 3B:
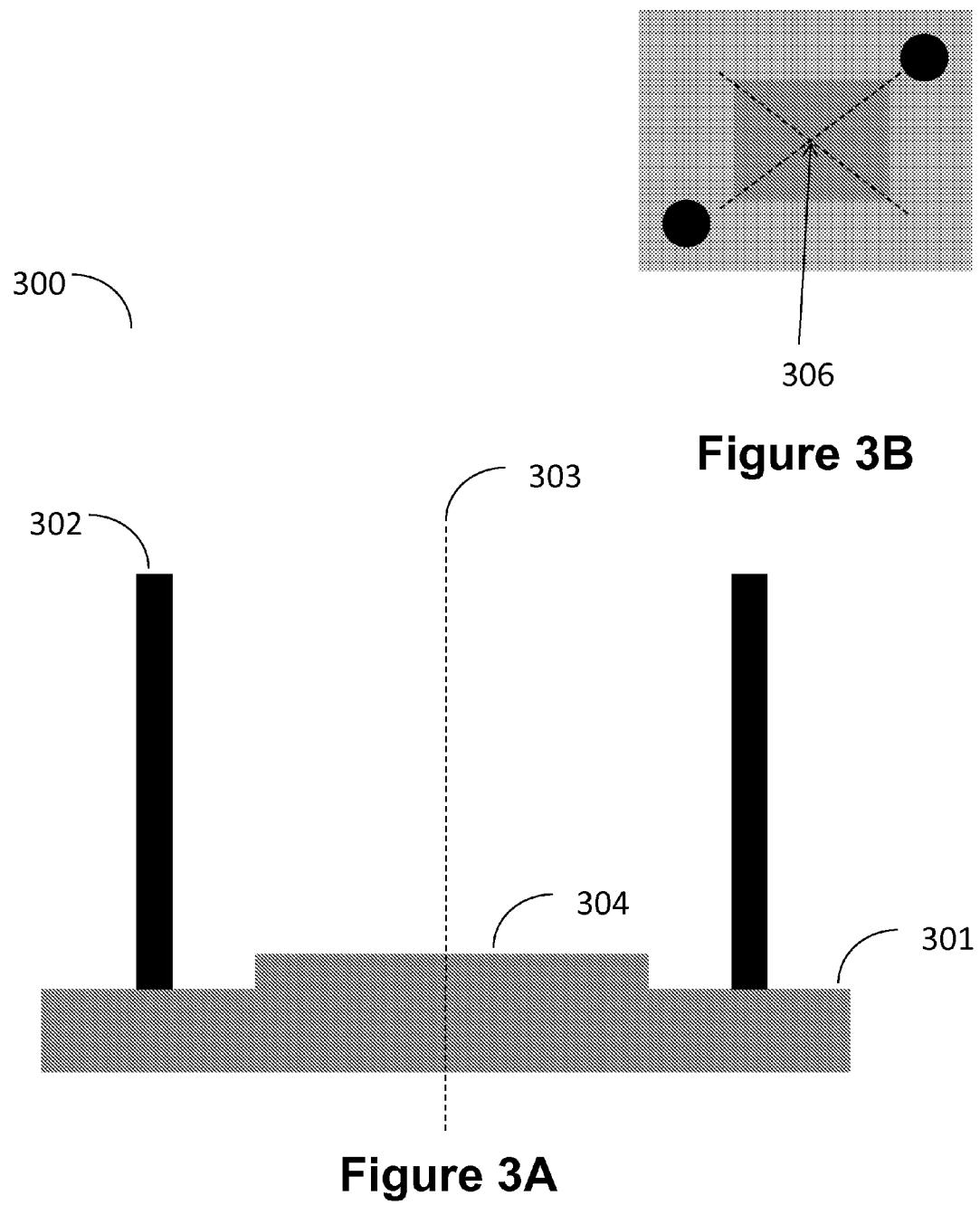
FIGS. 3A-3B illustrate camera module guide pins in accordance with certain embodiments, shown in section and plan view (inset).

Cameras in accordance with certain embodiments are configured to perform registration between the moving lens and the optical axis of the camera module during operation. With reference to FIG. 3, a camera module 301 is provided with one or more guide pins 302 that run parallel to the optical axis 303. The optical axis is determined by a line 305 drawn normal to the center of the imager 306. The guide pins can number up to 5 or more, and may be typically 2 or 3 in certain embodiments, while in another embodiment, one guide pin is used in combination with a second stabilization and alignment component. The one or more guide pins may be circular in cross-section, or alternatively may be elliptically-shaped, or may have be a regular or irregular polygon of any number of three or more sides.

In embodiments involving multiple (i.e., two or more) guide pins, the guide pins may be in some embodiments distributed in a substantially equidistant fashion about the image sensor, and in other embodiments, two guide pins are more closely spaced than a third guide pin, and in other embodiments, two guide pins are closer on one side than another while a second stabilization and alignment component is also used.

To provide motion substantially or approximately solely in a direction parallel to the optical axis, movable sleeves are placed over the guide pins in certain embodiments, as illustrated schematically in the example of FIG. 4. The sleeves can take many forms, some examples being shown in FIG. 4.

However, because advantageous camera modules in accordance with certain embodiments are configured to eliminate or significantly reduce mechanical play, the sleeve makes physical contact with the guide pin in a consistent and predictable manner throughout the stroke of the moveable lens group.

In addition, miniature cameras in accordance with certain embodiments are configured to minimize or significantly reduce friction force between the sleeve and guide pin. This feature advantageously assists the miniature actuator that is used to move the movable lens group, such that the actuator can move the movable lens group with a smaller applied motive force than if greater friction were present.

Advantageous low surface friction materials, bearings and/or other low friction components may be used. Geometries of the sleeve that are used in certain embodiments provide a small number of small area contact points to the guide pin. Examples include V-grooves, triangles, squares, pentagons, hexagons, ellipses and other regular and irregular curved shapes and polygons. Of these, V-grooves provide the fewest, i.e., two. A V-groove in a solid object may be realized from two faces set at an obtuse angle, such as from two faces of a pentagon that is larger in diameter than the guide pin, or alternatively from two faces set at an acute angle although these acute angle embodiments have an overall larger diameter than the obtuse angle embodiments.

In an example embodiment of a pentagon shape, in order to ensure that the same two faces of the pentagon are in contact with the guide pin, a further embodiment includes a mechanism or other stabilization or alignment component that ensures a small lateral force is always present between the pentagon and the guide pin. This force can typically range between 0.1 gf and 5 gf (gram-force), and may be between 0.2 gf and 2 gf and may be approximately 0.5 gf in certain embodiments. Lateral forces of this magnitude are advantageously developed in various embodiments using one or more springs, compressed materials (e.g., a block of rubber), and/or magnets.

Figure 5:
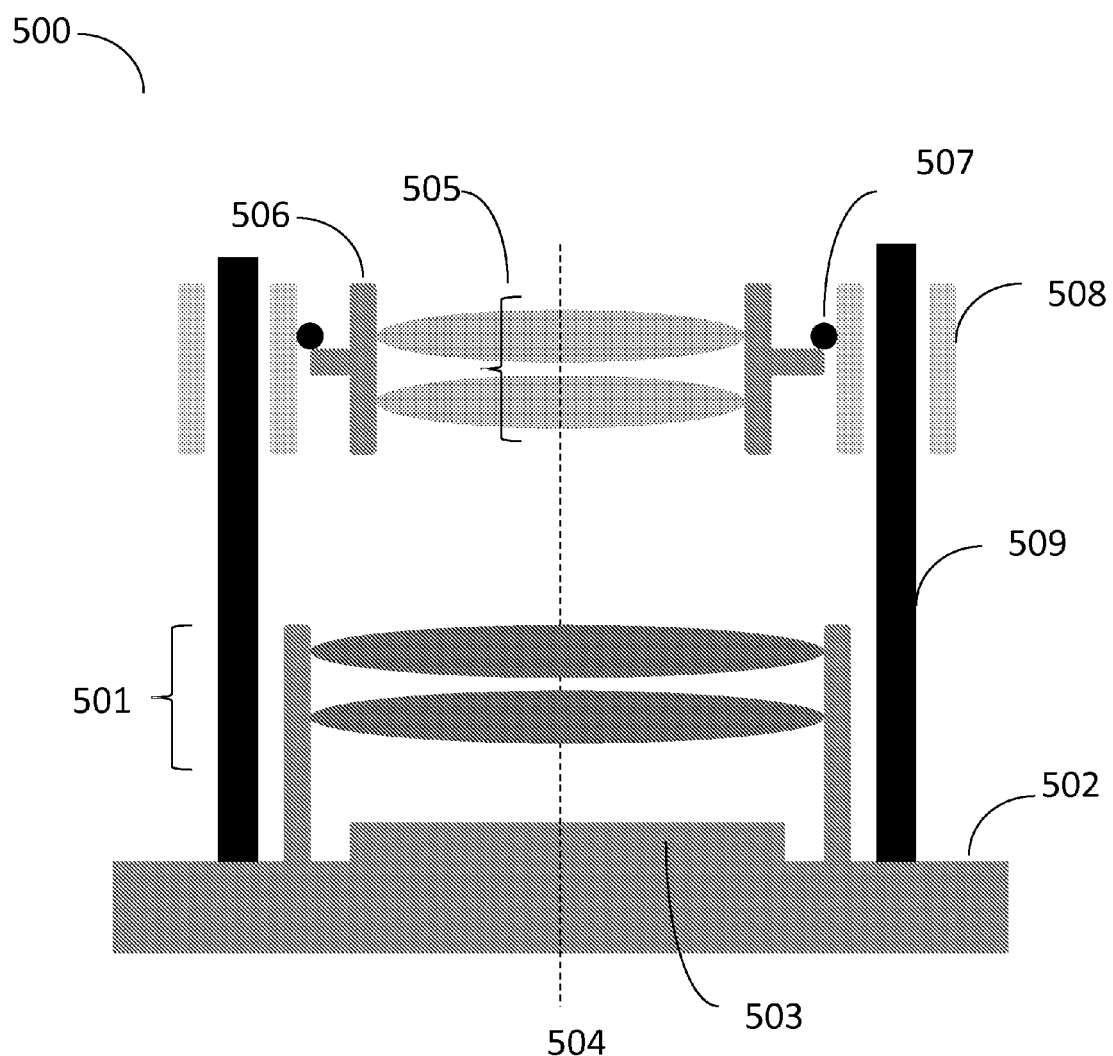
FIG. 5 illustrates an auto focus zoom camera module in accordance with embodiments including a moving lens mounted in a housing and the housing attached to sleeves that ride on guide pins.

The moving lens in several embodiments includes a group of individual lenses, apertures and optionally other optical components, these components are mounted together as a unitary element within a housing. The housing in certain embodiments is attached to one or more sleeves that couple with one or more guide pins. An example of one of these embodiments is schematically illustrated in FIG. 5. The fixed lenses 501 are connected to the camera module body 502, as is the imager 503. The imager defines the optical axis of the camera 504. The moving lenses 505 are located in a housing 506, which is joined by a medium 507 to a sleeve 508. The sleeves are located on the guide pins 509. Methods of making the joints between the housing and the sleeves, both of which include in certain embodiments polymeric materials, may include adhesive bonding.

Various embodiments are provided that involve methods of displacing the housing containing the moving lens group along the optical axis. An actuator is used in certain embodiments that can include, but is not limited to, devices that operate on principles of the piezo-electric, electro-magnetic, electro-thermal and electrostatic effects such as may involve a (micro-electro-mechanical system) MEMS component. Of these, a piezo-electric actuator may be used that delivers relatively high force. Other actuators may be selected that deliver an extended range of travel. The actuator is configured to deliver an approximately minimum force to overcome the friction forces of the sleeves against the guide pins and lift the weight of the housing, the one or more lenses and/or other optical components that the movable lens housing contains, against gravity.

The travel involved in many embodiments of the movable lens group in an auto focus zoom camera module is relatively small, e.g., in a range between 50 and 500 microns and may be in a range around approximately 350 microns or 200 microns In certain embodiments, an alternative to using guide pins and sleeves to control the motion of the housing along the optical axis of the camera involves use of components that are flexible in a direction along the optical axis, but relatively stiff in one or more other directions.

A leaf spring is used in certain embodiments. This advantageous leaf spring may include a strip of metal whose length is substantially greater than its width, which is in turn substantially greater than its thickness. The dimensional ratios may be around 10:1 in each case, and they are smaller or larger than this example ratio in several embodiments. By fixing one end of a leaf spring to a guide pin and the other end to the housing in accordance with certain embodiments, motion is largely restricted to being along the optical axis of the camera. In one embodiment, a total of four leaf springs are used, with two pairs on opposing sides of the camera housing. Where an even of leaf springs is used, a further embodiment involves half of the springs on each side to form an opposing pair. That is, extension of one spring results in compression in the other. This advantageous mechanical arrangement permits high stiffness at a low effective spring rate. The high stiffness greatly decreases motion of the housing in undesired directions while the low spring rate is advantageous when the camera module includes a miniature actuator that produces a relatively small force.

A miniature auto focus zoom camera that contains fixed and moving lenses in accordance with certain embodiments exhibits high image quality due to a high accuracy with which the optical elements, notably the lenses, are manufactured and assembled as an optical train. These optics are advantageously very close to the computed ideal design. One reason for this is that the assembly presents reduced risk, due to the lenses being placed to very high precision in one or more degrees of freedom and in certain embodiments, in five degrees of freedom. In certain embodiments, even rotation is prohibited for lenses that are not symmetric about the optical axis. Advantageous methods are used in assembling auto focus zoom cameras in accordance with certain embodiments, including high precision assembly of pre-assembled fixed and moving lenses.

A method in accordance with certain embodiments involves provide one or more lenses with one or more physical features that register with significant precision with an adjacent component such as the next lens in the optical train. Having accurately assembled the optical train, the optical train is then inserted into a housing. An adhesive is then applied to hold the lens train in position in the housing.

This method is particularly advantageous when used to assemble fixed and moving lenses and individual components, although adjustments for building an auto focus zoom camera module are provided in certain embodiments. The adjustments are provided because there is a space between the fixed and moving lens group in certain embodiments. This space can range between 50 and 500 microns, and may be in a range around approximately 250 microns in some embodiments, and in a range around approximately 100 microns in other embodiments. In these embodiments, the lenses do not abut for the purposes of registration while also being separated for operation at the same time.

Embodiments therefore include structures and a method that are used to provide accurate alignment between fixed and moving lenses that are separated by a gap. The basis of these embodiments is to provide adjacent surfaces of the fixed lens and the moving lens with physical registration features. While mating cups and cones are provided as examples of such features herein, various shapes and sizes of suitable alignment features may be used.

Figure 6:
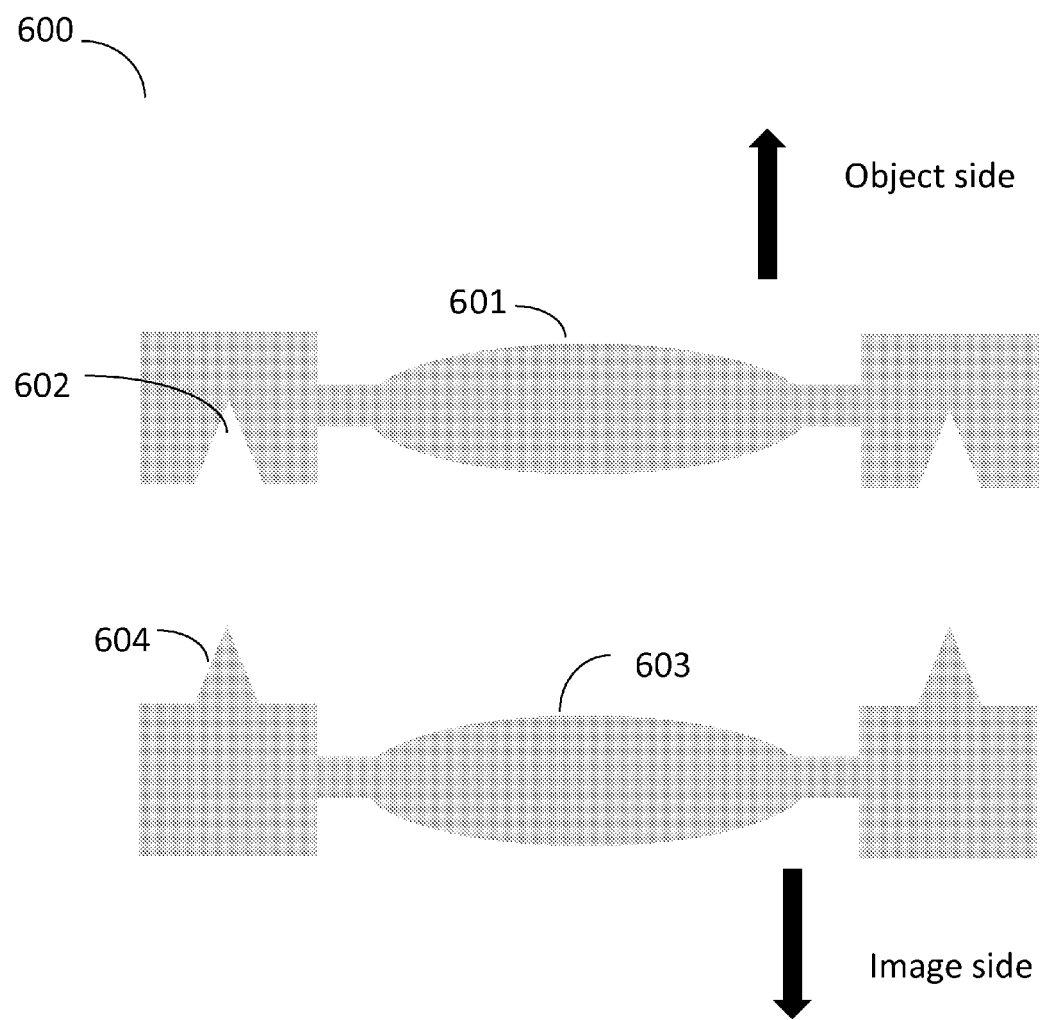
FIG. 6 depicts a detail view of an example of an optical train in accordance with embodiments where the fixed and moving lenses can be been aligned to each other by physical features.

With reference to FIG. 6, the lower moving lens 601 has a cone 602 on its image side while the upper fixed lens 603 has a cup 604 on its object side. The cones and cups can be reversed so the cups are on the image side and the cones are on the object side. The optical train can be aligned by stacking of the lenses so the cups and cones nest. The cups and cones provide significantly precise registration in plan and rotation from the object side of the moving lens to the image side of the fixed lens. The pitch, yaw and vertical spacing between lenses is dictated by the precision with which the physical registration features abut. In FIG. 6, it is the lenses themselves that are depicted as designed abutting; however the abutting components between the fixed and moving lenses may include additional components such as spacers.

Figure 7:
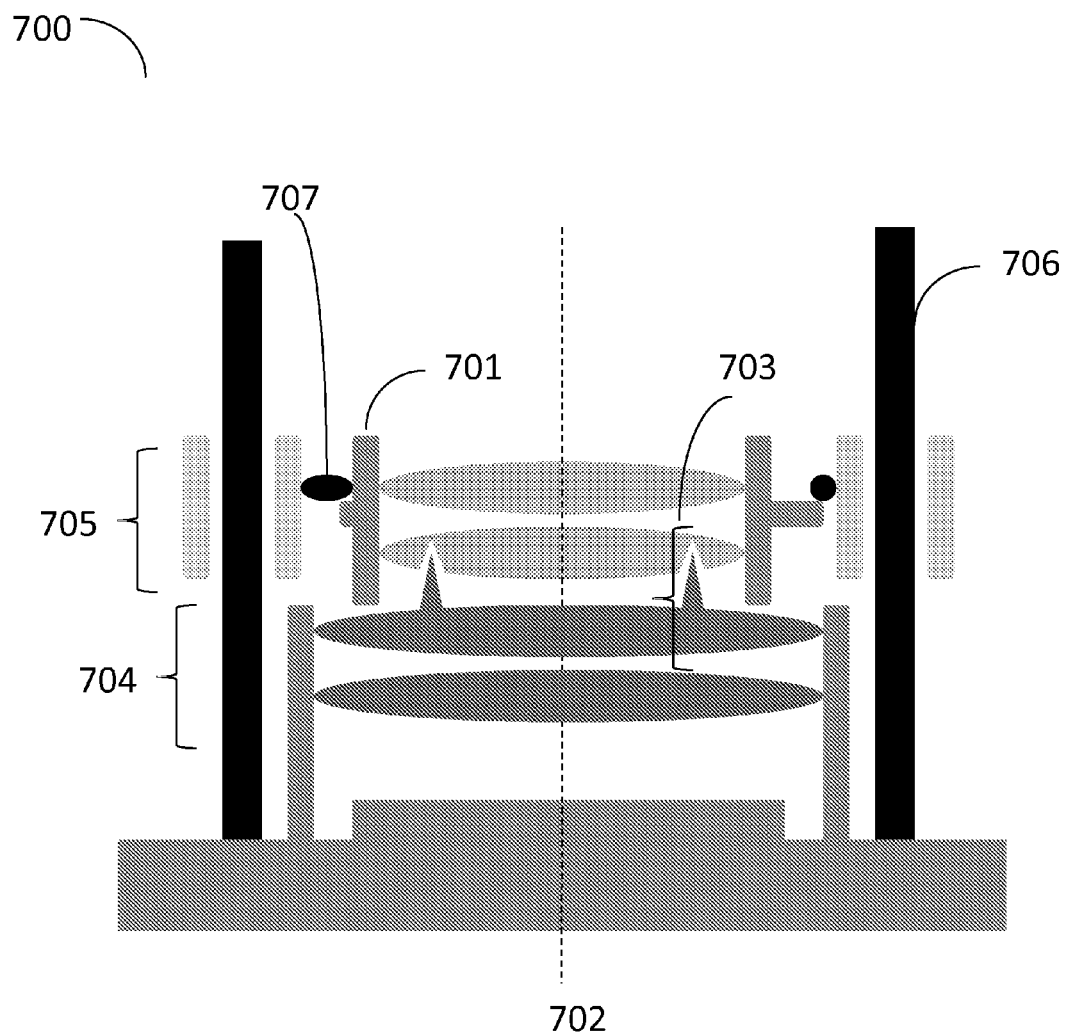
FIG. 7 illustrates an auto focus zoom camera module at intermediate state of assembly where the fixed and moving lenses are aligned by registration features, but the housing of the moving lenses is not attached to the sleeves.
Figure 8:
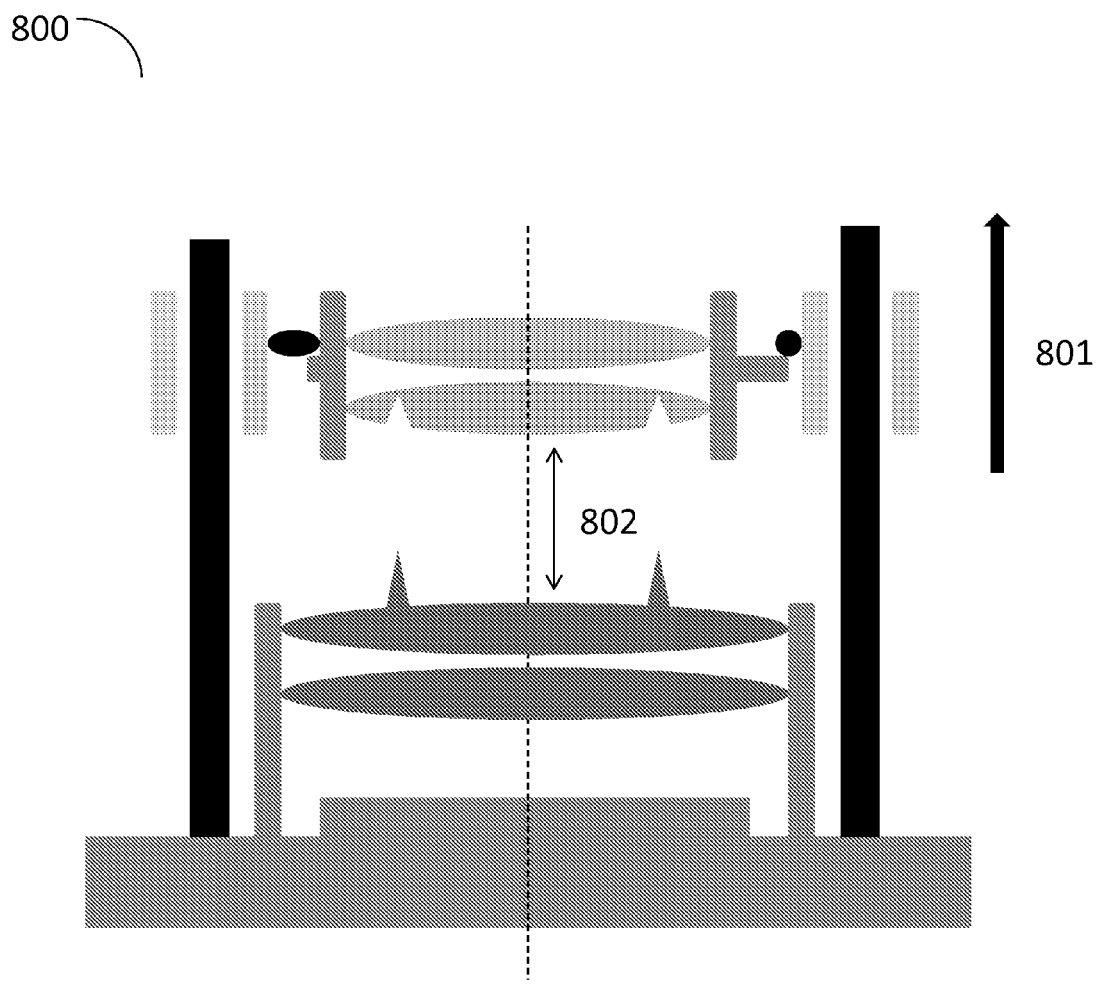
FIG. 8 illustrates a cross-section of a completed camera where a housing that is offset to the optical axis has been joined to the sleeves with the fixed and moving lenses still aligned to each other but separated by a working distance.

At this juncture, with the fixed and moving lenses abutted, the optical train is precisely aligned. FIG. 7 schematically illustrates an autofocus zoom camera module at this step of assembly. The housing 701 has been deliberately drawn asymmetrically with respect to the optical axis, 702 to illustrate that it is the cup and cone registration features 703 that provide the alignment between the fixed 704 and moving lenses 705 at this juncture, not the housing and guide pins 706. Adhesive 707, or another joining method may be applied and activated in certain embodiments to attach the housing to the sleeves, or the leaf springs, as appropriate. Because the guide pins are parallel to the optical axis, the housing may now be displaced (801) along the optical axis until the desired separation (802) between the fixed and moving lenses is obtained, without significantly altering the alignment between the fixed and moving lenses. The resulting structure then appears as drawn in FIG. 8.

Lenses may be assembled in alternative embodiments into a lens turret to form the optical train. In certain alternative embodiments, the lens turret may be fabricated with an accurate interior space, and the lenses of the movable group inserted and fixed in the desired location inside the lens turret. In the preceding discussion and drawings it has generally been presumed that mechanical components of an autofocus camera, such as guide pins, sleeves and a housing in certain embodiments, are symmetric about the optical axis of the camera. In certain embodiments this is desirable, while in others it is not.

Figure 9:
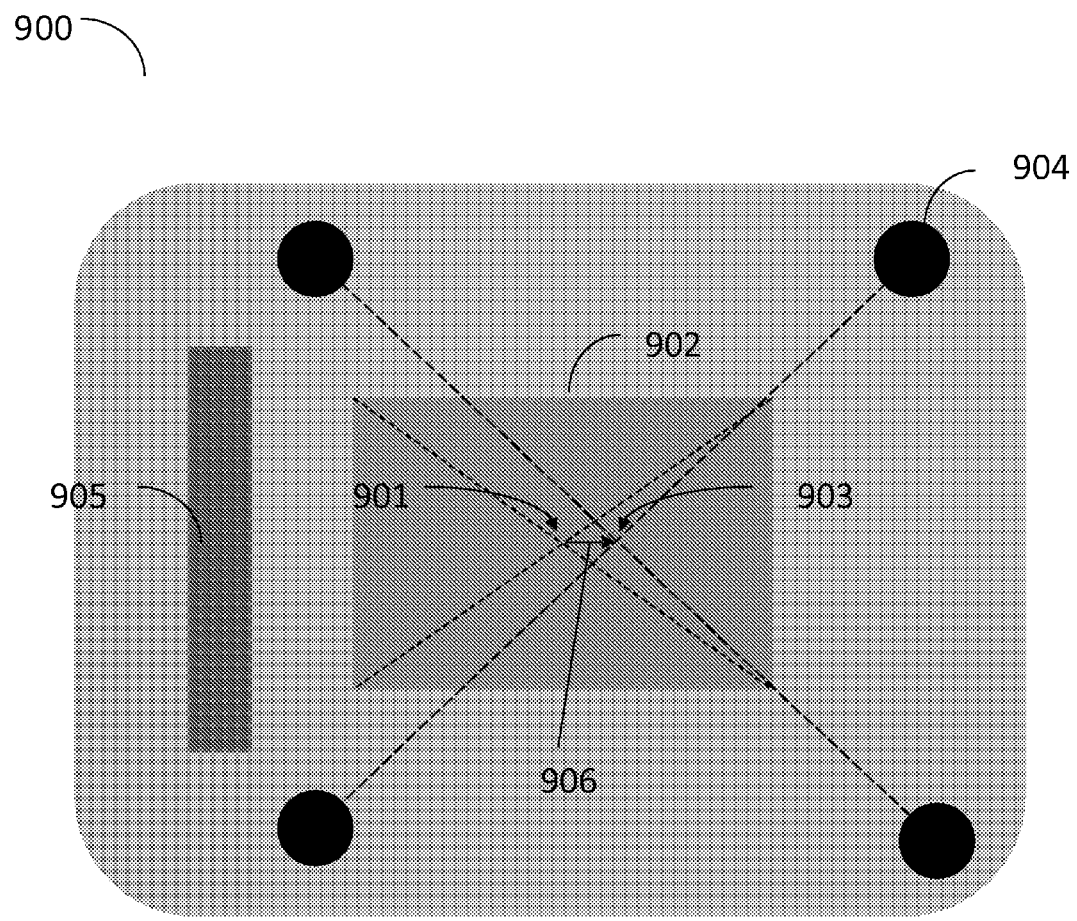
FIG. 9 depicts a plan view of an auto focus zoom camera where the mechanical axis of the guide pins is offset from the optical axis.

An example of one or these embodiments is schematically illustrated at FIG. 9. The optical axis of the camera 901 is derived from the imager 902. The mechanical axis 903 is derived from the guide pins 904 (four guide pins are drawn to illustrate the central location). Because the camera module of this embodiment includes an actuator 905, which takes space, the mechanical axis is displaced 906 from the optical axis a distance that can range to 0.5 mm in some embodiments, or 0.2 mm in other embodiments, or 0.1 mm or smaller in further embodiments.

FIGS. 10A-10B illustrate differences between optics for a fixed focus camera compared with an auto-focus camera. The fixed focus camera of FIG. 10A has not moving lenses and instead includes five fixed lenses L1-L5. FIG. 10B illustrates an example of an auto-focus camera wherein five lenses L1-L5 are movable together to adjust focus of an object at an arbitrary distance from the camera module onto the image sensor. Using a voice coil motor or VCM actuator, the five lenses L1-L5 are movable to adjust the focus. As described above, a MEMS actuator is included in accordance with several embodiments to move one or more movable lenses quickly and without adding nearly as significantly to a Z height of the camera module or thickness along the optical path or direction of motion of the movable lens or movable lenses.

FIG. 10C illustrates an example of an optical train for an autofocus zoom camera in accordance with embodiments. In the example of FIG. 10C, lenses L1-L4 that are nearest an object end of the optical path are movable to achieve autofocus functionality, while L5 is fixed nearest to the image sensor. In fact, lens L5 has a back focal length equal to its distance from the plane of the image sensor. As described above, electronic zoom may be provided by a combination of this fixed L5 lens and data processing. The lens L5 is designed to compensate for a big field curvature. The overall optical assembly may have fewer than five lenses or more than five lenses. Moreover, the movable lens group may include fewer than four lenses, and may include as few as one lens that may be disposed at position L1, L2, L3 or L4 when L5 is designed to provide zoom functionality.

Figure 11:
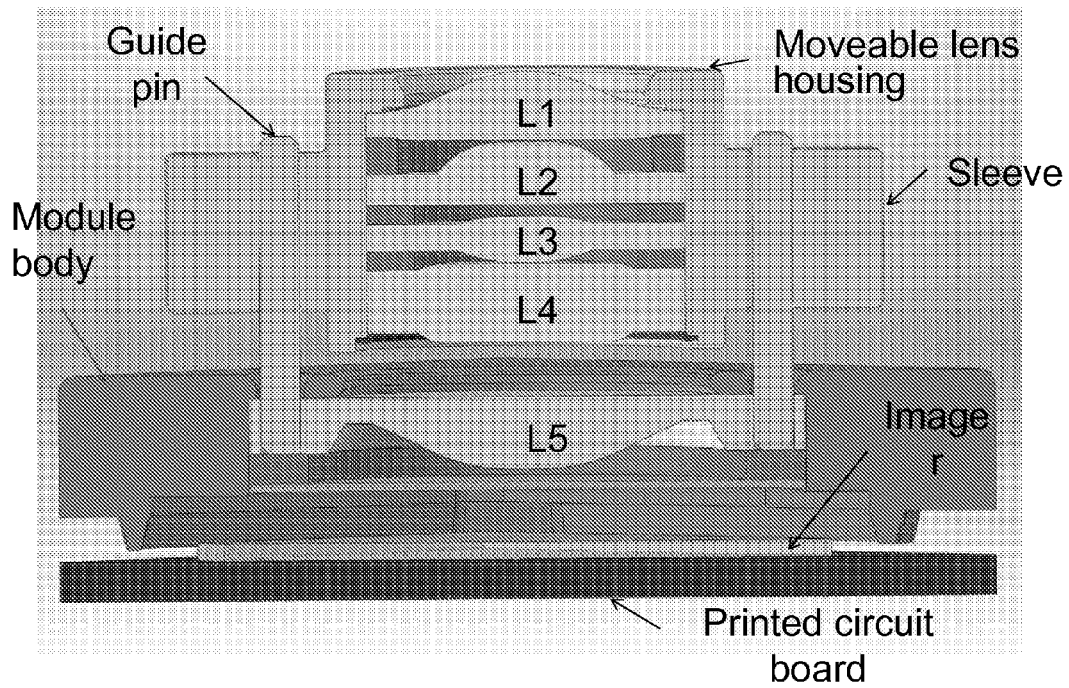
FIG. 11 illustrates a section view of a camera module in accordance with certain embodiments.

FIG. 11 illustrates a section view of a camera module in accordance with certain embodiments. In the example of FIG. 11, L1-L4 are movable while L5 is fixed nearest the image sensor. The movable lenses L1-L4 are disposed in a movable lens housing that is coupled to a camera module body or image sensor component that is itself coupled to a flexible printed circuit. The movable lens housing utilizes a set of pairs of guide pins and sleeves to facilitate the motion of the movable lenses L1-L4 as actuated by the MEMS, piezo, VCM or other actuator (not shown in FIG. 11).

Figure 12:
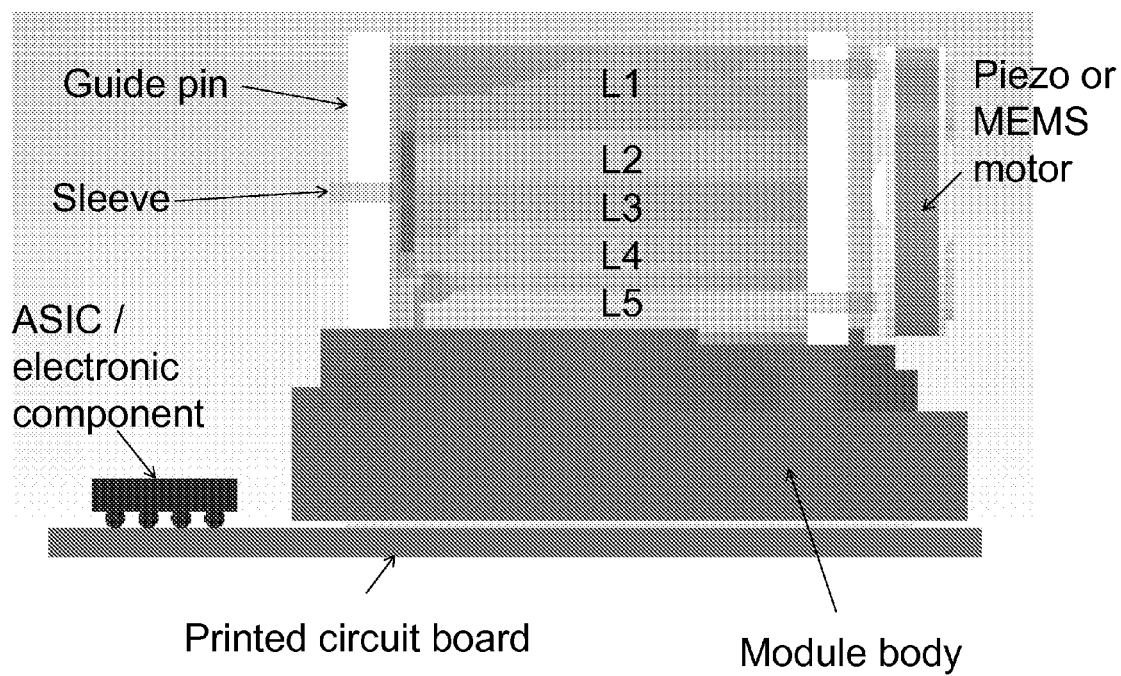
FIG. 12 illustrates a side view of the camera module of FIG. 11.

FIG. 12 illustrates a side view of the camera module of FIG. 11. A piezo motor is indicated in the example of FIG. 12 for moving the movable lens housing using the sleeves and guide pins. Alternatively, a MEMS actuator may be used to move one, two, three or four movable lenses to facilitate an autofocus feature or an autofocus zoom feature of an advantageous camera module. The de-center and tilt alignment of the movable lens group is advantageously precise as described herein, while objects at arbitrary distances from the camera module are automatically brought to focus by movement of the movable lens or movable lenses of the autofocus camera module. An ASIC or other electronic component is illustrated in FIG. 12 as also being coupled to the flexible printed circuit along with the camera module.

Figure 13:
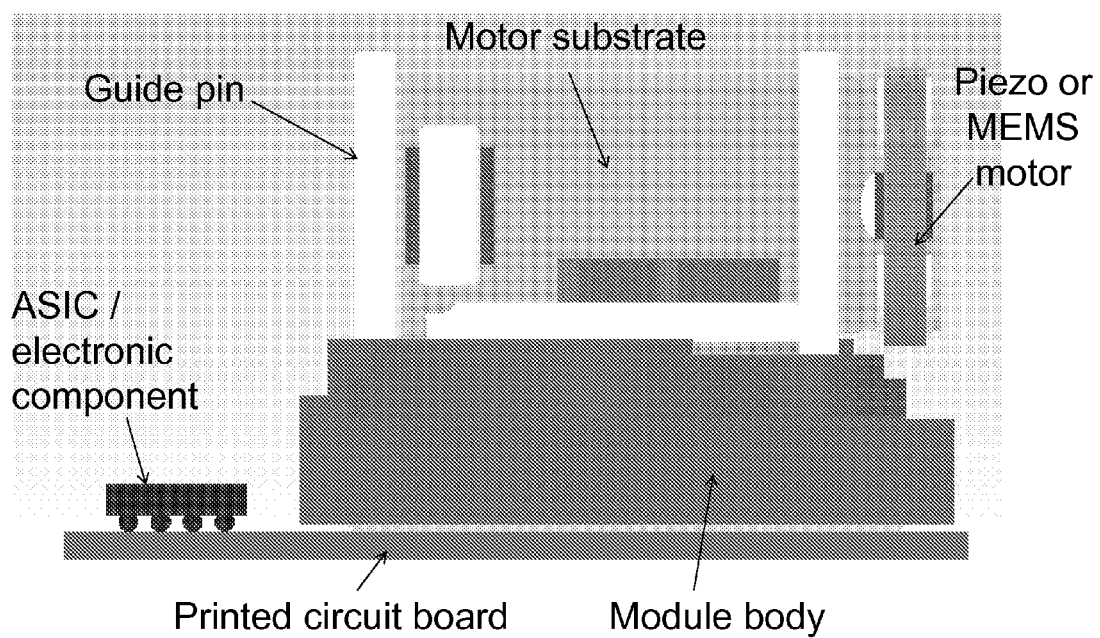
FIG. 13 illustrates the side view of the camera module of FIG. 12 without the lenses.

FIG. 13 illustrates the side view of the camera module of FIG. 12 without the lenses L1-L5. In the example wherein a piezo is used, a motor substrate is included as illustrated at FIGS. 12-13.

Figure 14:
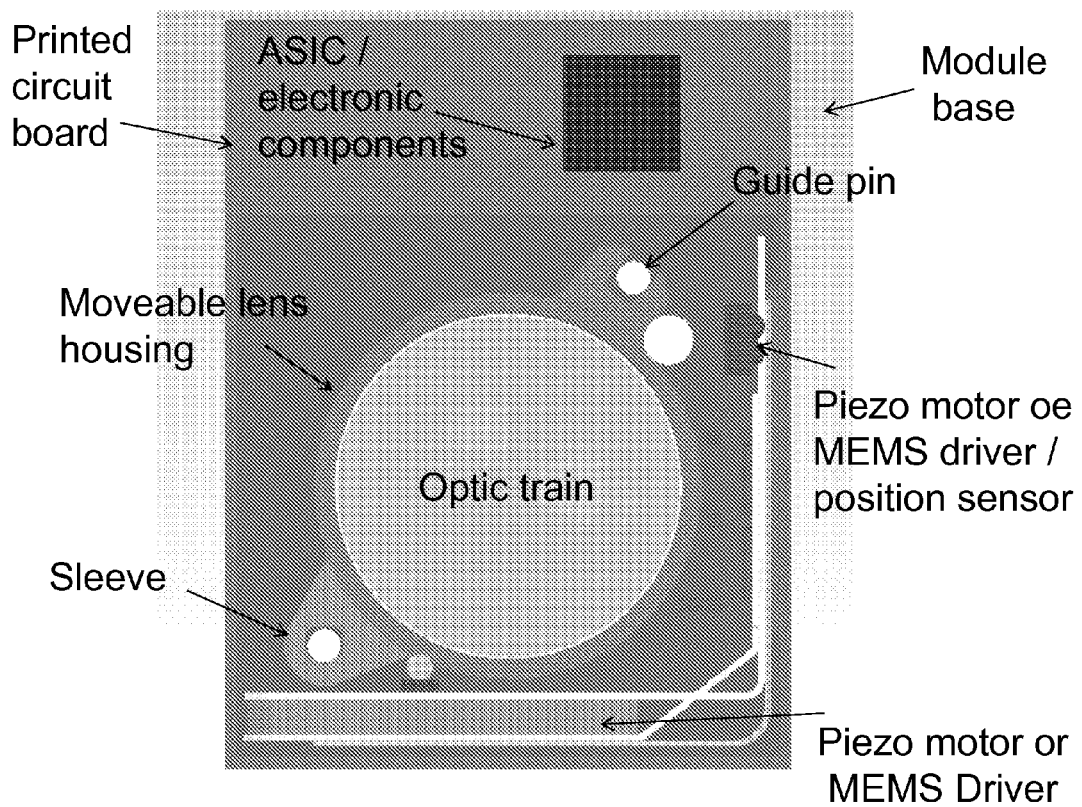
FIG. 14 illustrates a top view of the camera module of FIGS. 11-13.

FIG. 14 illustrates a top view of the camera module of FIGS. 11-13. Two pairs of sleeves and guide pins are shown in this embodiment to translate the movable lens housing containing the movable lens group of the optical train of the camera module relative to the image sensor and to the camera module housing and to one or more fixed lenses in certain embodiments. The camera module of FIG. 14 includes a piezo motor or MEMS for moving the movable lens housing and/or one or more movable lenses of the optical train whether or not the lens barrel also itself is movable. In the embodiment wherein lenses L1 and L2 are fixed in a first fixed lens group and lenses L4 and L5 are fixed in a second fixed lens group and only lens L3 is movable to facilitate autofocus, the movable lens housing may itself by fixed while the MEMS component is coupled to the lens L3 and moves the lens L3 to adjust the focus distance to objects disposed at arbitrary distances to the camera module. A position sensor may be included for monitoring, tracking, sensing and/or determining a position of the movable lens housing or of the one or more movable lenses of the optical train. An orientation sensor may also be included in the form of an accelerometer or by utilizing capacitance values for MEMS positioning components as described in more detail separately.

FIGS. 15-18 illustrate advantageous examples involving zoom factors for camera modules in accordance with embodiments. In certain embodiments, optical zoom (OZ) may be used to create zoom using a distorted lens and excess amount of pixels in the sensor. The optical zoom factor may be calculated a product of lens distortion zoom and extra pixels zoom and a digital component. In one example wherein a five megapixel or 5 MP output is provided, then for a sensor having excess pixels up to 8 MP, a zoom factor of 1.265 is achieved by the extra pixels. For excess pixels up to 10, 12 or 14 MP, zoom factors of 1.414, 1.550 and 1.673 are respectively achieved.

A zoom factor provided by an optical zoom lens depends on the allowed total track length (TTL) of the lens. For example, for a large TTL (e.g., around 7 mm), a zoom factor of 1.42 is achieved at center field, while for a smaller TTL (e.g., around 5.7 mm), a zoom factor of 1.32 is achieved at center field in certain embodiments. Continuing with these examples, if a 5 MP output is provided, and a 12 MP input sensor is available, then for low TTL, an overall zoom factor obtained by the optical zoom system at center field is about ×2. For a larger lens and TTL of 7 mm, e.g., the optical zoom factor is about ×2.2. FIGS. 17-18 respectively illustrate zoom factors for a 12 MP input sensor and an 8 MP input sensor.

While example drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention. For example, camera modules in accordance with various embodiments and component of camera modules are described at U.S. patent application Ser. Nos. 13/732,276, 13/571,393, 13/571,395, 13/571,397, 13/571,405, 13/445, 857, 61/643,331, 61/657,012, 61/675,812, 61/698,567, 61/748,054, 61/748,062, 61/622,480.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited herein are incorporated by reference, as well as the background, abstract and brief description of the drawings, and U.S. application Ser. Nos. 12/213,472, 12/225,591, 12/289,339, 12/774,486, 13/026, 936, 13/026,937, 13/036,938, 13/027,175, 13/027,203, 13/027,219, 13/051,233, 13/163,648, 13/264,251, and PCT application WO2007/110097, and U.S. Pat. Nos. 6,873,358, and RE42,898 are each incorporated by reference into the detailed description of the embodiments as disclosing alternative embodiments.

The following are also incorporated by reference as disclosing alternative embodiments:

U.S. Pat. Nos. 8,331,715, 8,279,301, 8,270,674, 8,224, 108, 8,184,967, 8,055,090, 8,055,029, 7,855,737, 7,995,804, 7,970,182, 7,916,897, 8,081,254, 7,620,218, 7,995,855, 7,551,800, 7,515,740, 7,460,695, 7,965,875, 7,403,643, 7,916,971, 7,853,043, 7,773,118, 8,055,067, 7,844,076, 7,315,631, 7,792,335, 7,680,342, 7,692,696, 7,599,577, 7,606,417, 7,747,596, 7,506,057, 7,685,341, 7,694,048, 7,715,597, 7,565,030, 7,636,486, 7,639,888, 7,634,109, 7,536,036, 7,738,015, 7,590,305, 7,362,368, 7,352,394, 7,564,994, 7,315,658, 7,630,006, 7,440,593, 7,317,815;

U.S. patent application Ser. Nos. 13/306,568, 13/282,458, 13/234,149, 13/234,146, 13/234,139, 13/220,612, 13/084, 340, 13/078,971, 13/077,936, 13/077,891, 13/035,907, 13/028,203, 13/020,805, 12/959,320, 12/944,701, and 12/944,662;

United States published patent applications serial nos. 20120019614, 20120019613, 20120008002, 20110216156, 20110205381, 20120007942, 20110141227, 20110002506, 20110102553, 20100329582, 20110007174, 20100321537, 20110141226, 20100141787, 20110081052, 20100066822, 20100026831, 20090303343, 20090238419, 20100272363, 20090189998, 20090189997, 20090190803, 20090179999, 20090167893, 20090179998, 20080309769, 20080266419, 20080220750, 20080219517, 20090196466, 20090123063, 20080112599, 20090080713, 20090080797, 20090080796, 20080219581, 20090115915, 20080309770, 20070296833, and 20070269108.

What is claimed is:

1. A miniature MEMS autofocus camera module comprising:
    an image sensor;
    a MEMS actuated movable lens group and at least one fixed lens group defining an optical axis within a camera module housing within which objects disposed an arbitrary distance from the camera module are automatically focused at a determined zoom to the image sensor by MEMS actuation of the movable lens group to accomplish autofocus functionality;
    a distorting fixed lens disposed adjacent to the image sensor; and
    a processing component to estimate a zoom factor, by using the distorting fixed lens, so as to electronically zoom an image while maintaining a full resolution of the image;
    wherein the at least one fixed lens group comprises at least first and second lens groups, and wherein the movable lens group is disposed between the first and second fixed lens groups.

2. The miniature MEMS autofocus camera module of claim 1, further comprising embedded code for programming the processing component to electronically zoom the image data.

3. The miniature MEMS autofocus camera module of claim 2, wherein the electronic zoom utilizes both electronic and optical processing elements.

4. The miniature MEMS autofocus camera module of claim 3, wherein the autofocus functionality also utilizes both electronic and optical processing elements.

5. The miniature MEMS autofocus camera module of claim 4, wherein at least one lens participates as a same electronic and optical processing element used for both the autofocus functionality and the electronic zoom.

6. The miniature MEMS autofocus camera module of claim 1, further comprising at least one guide pin disposed in parallel with the optical axis to perform a registration between moving and fixed lenses.

7. The miniature MEMS autofocus camera module of claim 6, wherein the at least one guide pin is enclosed in a movable sleeve.

8. The miniature MEMS autofocus camera module of claim 1, wherein a moving lens of the movable lens group includes at least one cone on a surface of the moving lens, and a fixed lens of the at least one fixed lens group includes at least one corresponding cup on a surface of the fixed lens that is adjacent to the moving lens.

9. A method of operating the miniature MEMS autofocus camera module of claim 1, the method comprising:
   actuating the movable lens group using a MEMS actuator coupled to the movable lens group to focus an image onto the image sensor; and
   performing electronic zoom operations on the image that maintain a full resolution of the image.

10. A method of making the miniature MEMS autofocus camera module of claim 1, the method comprising:
   providing the first and second lens groups of the at least one fixed lens group;
   providing the movable lens group; and
   disposing the movable lens group between the first and second fixed lens groups.

11. A camera comprising the miniature MEMS autofocus camera module of claim 1.

12. An automobile comprising the miniature MEMS autofocus camera module of claim 1.

13. An optical assembly for a miniature MEMS autofocus camera module comprising:
   a MEMS actuated movable lens group and at least one fixed lens group defining an optical axis within a housing coupleable with an image sensor component to capture digital images of objects disposed an arbitrary distance from the camera module that are automatically focused at a determined zoom to an image sensor portion of the image sensor component by MEMS actuation of the movable lens group to accomplish autofocus functionality;
   a distorting fixed lens to be disposed adjacent to the image sensor component and for use by a processing component to estimate a zoom factor to electronically zoom an image while maintaining a full resolution of the image, wherein the at least one fixed lens group comprises at least first and second lens groups, and wherein the movable lens group is disposed between the first and second fixed lens groups.

14. The optical assembly for a miniature MEMS autofocus camera module of claim 13, further comprising contact pads for coupling with the processing component programmed to electronically zoom the digital images.

15. The optical assembly for a miniature MEMS autofocus camera module of claim 14, wherein the electronic zoom utilizes both electronic and optical processing elements.

16. The optical assembly for a miniature MEMS autofocus camera module of claim 15, wherein the autofocus functionality also utilizes both electronic and optical processing elements.

17. The optical assembly for a miniature MEMS autofocus camera module of claim 16, wherein at least one lens participates as a same electronic and optical processing element used for both the autofocus functionality and the electronic zoom.

* * * * *